United States Patent [19]

Mizuguchi et al.

[11] Patent Number: 5,298,063
[45] Date of Patent: Mar. 29, 1994

[54] NOVEL ELECTROCHROMIC COMPOSITIONS BASED ON DIKETOPYRROLOPYRROLES

[75] Inventors: Jin Mizuguchi; Alain C. Rochat, both of Fribourg, Switzerland

[73] Assignee: Ciba-Geigy Corporation, Ardsley, N.Y.

[21] Appl. No.: 945,075

[22] Filed: Sep. 15, 1992

Related U.S. Application Data

[62] Division of Ser. No. 730,418, Jul. 16, 1991, Pat. No. 5,169,953.

[30] Foreign Application Priority Data

Jul. 20, 1990 [CH] Switzerland ............... 2418/90

[51] Int. Cl.$^5$ ............................................. C09D 11/00
[52] U.S. Cl. ........................ 106/21 D; 548/452; 503/202; 503/218; 106/21 A
[58] Field of Search .............. 548/452; 503/202, 218; 106/21 A, 21 D

[56] References Cited

U.S. PATENT DOCUMENTS

| | | | |
|---|---|---|---|
| 4,415,685 | 11/1983 | Iqbal et al. | 524/92 |
| 4,490,542 | 12/1984 | Iqbal et al. | 548/453 |
| 4,579,949 | 4/1986 | Rochat et al. | 546/167 |
| 4,585,878 | 4/1986 | Jost et al. | 548/453 |
| 4,659,775 | 4/1987 | Pfenninger et al. | 524/92 |
| 4,666,485 | 5/1987 | Huey | 65/2 |
| 4,686,547 | 8/1987 | Hayashi et al. | 503/202 |
| 4,778,899 | 10/1988 | Pfenninger et al. | 548/453 |
| 4,791,204 | 12/1988 | Jost et al. | 548/101 |
| 4,914,211 | 4/1990 | Jost et al. | 548/453 |

FOREIGN PATENT DOCUMENTS

| | | | |
|---|---|---|---|
| 0124296 | 11/1984 | European Pat. Off. | 503/202 |
| 3713459 | 8/1988 | Fed. Rep. of Germany. | |
| 0132587 | 8/1983 | Japan | 503/202 |
| WO901480 | 2/1990 | PCT Int'l Appl. | |

OTHER PUBLICATIONS

T. Gamble et al., Glaste Chemische Berichte 62, 38 (1989).

H. Hamada et al; Displays, 1983, 221.
H. Mori, et al., Proc. S.I.D. 25, 331 (1984).
A. Yasuda, et al., Jap. J. Appl. Phys. 26, 1352 (1987).
H. Mori et al., Jap. J. Appl. Phys. 26, 1356 (1987).
T. Sugimoto et al, Angew Chem. Int. Ed, Engl., 27, 560 (1988).
Y. Ueno, et al., Jap. J. Appl. Phys. 24, L178 (1985).

*Primary Examiner*—David B. Springer
*Attorney, Agent, or Firm*—Luther A. R. Hall

[57] ABSTRACT

Compositions containing
(a) at least one 1,4-diketopyrrolo[3,4-c]pyrrole of the formula I, II, IIa, III or IV

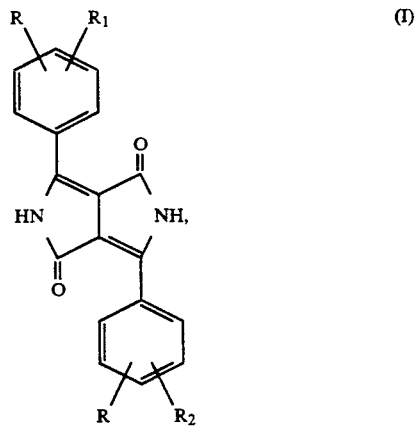

(I)

(Abstract continued on next page.)

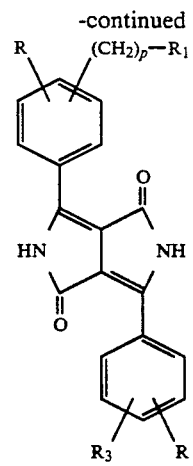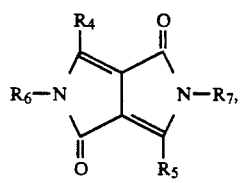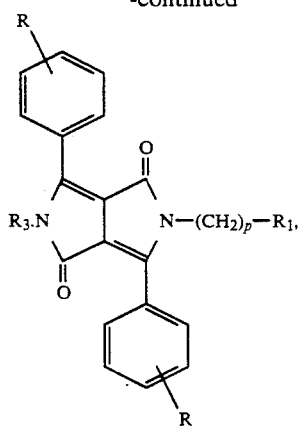

and (b) an auxiliary redox system from the ferrocyanide, ferrocene or ammonium iron(II) sulfate series in combination with at least one conductive salt (c), where, in the formula I, R and $R_2$ are, for example, —H and $R_1$ is —$SO_3Na$, in the formulae II and IIa, R and $R_3$ are, for example, —H, $R_1$ is —$SO_3H$ and p is 3, in the formula III, $R_4$ and $R_5$ are, for example, phenyl and $R_6$ and $R_7$ are, for example, methyl, and in the formula IV $R_8$ and $R_9$ are, for example, phenyl, are suitable as electrochromic materials in display systems.

6 Claims, No Drawings

NOVEL ELECTROCHROMIC COMPOSITIONS BASED ON DIKETOPYRROLOPYRROLES

This is a divisional of application Ser. No. 07/730,418, filed on Jul. 16, 1991, which is now U.S. Pat. No. 5,169,953, granted on Dec. 8, 1992.

The present invention relates to novel compositions containing certain diketopyrrolopyrroles in combination with an auxiliary redox system and at least one conductive salt, to the use of these compositions as electrochromic materials in display systems, and to processes for their preparation.

Optical display systems for the formation of, for example, letters, numbers images in display systems are known; they use, for example, liquid-crystal displays, electroluminescence displays or plasma displays or electrochromic materials.

Electrochromic mateials allow continuous and reversible changes in the absorption and reflection of the optically effective compounds employed to be produced. With the aid of an electrochemical redox reaction, a change in colour is produced for a certain time on or very close to the display electrode and repeated continuously at the desired intervals depending on the areas of application. Various electrochromic materials have already been proposed: inorganic compounds, for example $WO_3$, $V_2O_5$, iridium oxides, nickel oxides or $Fe_4[Fe(CN)_6]_3$ (Prussian Blue), and furthermore, organic materials, for example bipyridinium salts (so-called viologens), metal phthalocyanines of the rare earths, tris(bipyridyl)ruthenium(III) complexes or thieno[3,2-b]thiophenes, and polymeric materials, such as polythiophenes or polypyrroles. In this connection, cf. Glastechnische Berichte 62/1989, No. 2, 38–45; Displays, Oct. 1983, 221–225; Procedings of the SID, Vol. 25/4(1984), 331–334; Japanese Journal of Applied Physics 26, 1352–1355 and 1356–1360; Angew. Chem., Int. Engl. 27(1988), 560–561; Japanese Journal of Applied Physics 24, 1985, L178–L180.

The systems proposed therein allow single-coloured displays (for example especially in organic materials) to be produced; however, they do not always meet the a specific display colour, in particular in inorganic materials) or multicoloured displays (for example high demands of industry, and in particular the wide range of customer wishes with respect to the three primary colours, for example for television sets or display systems, cannot always be achieved.

It has now been found that the use of certain diketopyrrolopyrroles in combination with an auxiliary redox system and at least one conductive salt allows multicoloured, electrochromic displays of high contrast, long service life and good readability to be obtained.

The present invention accordingly provides compositions containing (a) at least one 1,4-diketopyrrolo[3,4-c]pyrrole of the formula I, II, IIa, III or IV

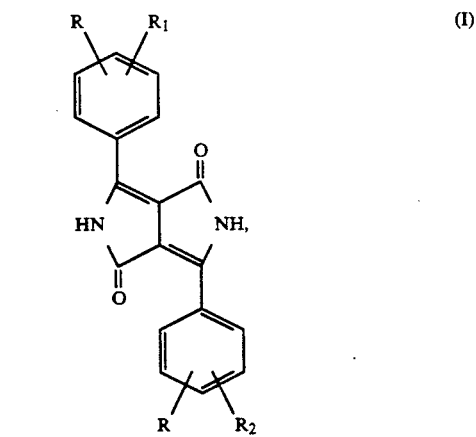

(I)

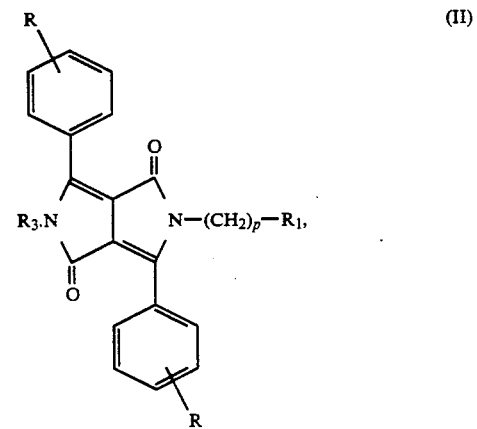

(II)

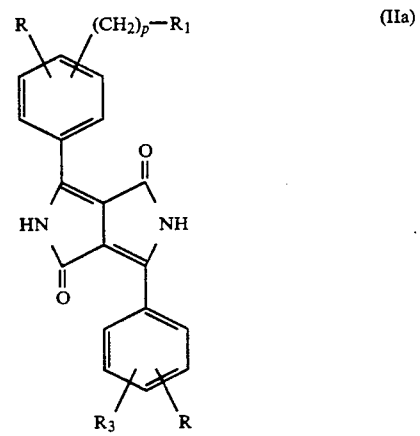

(IIa)

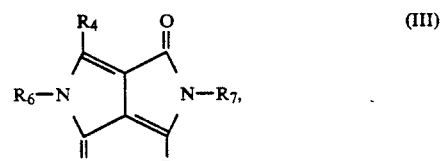

(III)

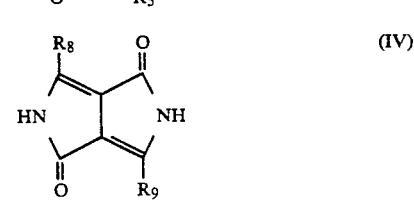

(IV)

and (b) auxiliary redox system from the ferrocyanide, ferrocene or ammonium iron(II) sulfate series in combination with at least one conductive salt (c), where, in the formulae I, II and IIa, the two groups R, independently of one another, are —H, halogen, $C_1$–$C_4$alkyl, $C_1$–$C_4$alkoxy, $C_1$–$C_4$mercaptoalkyl, —CN, —$CF_3$ or phenyl, $R_2$ is —H or $R_1$, and $R_3$ is —H or a group of the formula —$(CH_2)_p$—$R_1$, p is an integer from 1 to 6, and $R_1$ is a group of the formula —$CO_2L$, —$SO_3L$, —$PO_3L$ or —$N^+(R_{10})(R_{11})(R_{12})X^-$ in which X is a halogen ion, $(SO_4)^{2-}$, $(SO_3OCH_3)^-$ or $(SO_3OC_2H_5)^-$ and L is —H, a group of the formula $M^{+n}/n$ or $^+NH(R_{10})(R_{11})(R_{12})$ where M is a monovalent, divalent or trivalent metal cation, n is the number 1, 2 or 3, and $R_{10}$, $R_{11}$ and $R_{12}$, independently of one another, are —H, $C_1$–$C_{18}$alkyl, $C_7$–$C_{12}$phenylalkyl, $C_5$–$C_6$cycloalkyl, or pnenyl or naphthyl which is unsubstituted or substituted by halogen, $C_1$–$C_4$alkyl or $C_1$–$C_4$alkoxy, or $R_{10}$ and $R_{11}$, together with the nitrogen atom, form a 5–6-membered heterocyclic radical, or $R_{10}$, $R_{11}$ and $R_{12}$, together with the nitrogen atom, form a 5–6-membered aromatic heterocyclic radical, in the formula III, $R_4$ and $R_5$, independently of one another, are unsubstituted or halogen-, $C_1$–$C_4$alkyl- or $C_1$–$C_4$alkoxy-substituted naphthyl, phenyl or pyridyl, which in turn can be substituted by one or two halogen atoms, one or two $C_1$–$C_4$alkyl or $C_1$–$C_4$alkoxy groups, furthermore by $C_1$–$C_4$alkylmercapto, —CN, $CF_3$, —$CCl_3$, —$CONH_2$, $C_2$–$C_5$alkoxycarbonyl or unsubstituted or halogen-, $CH_3$ or $OCH_3$-substituted phenyl, phenoxy, thiophenoxy or N-phenylcarbamoyl, and $R_6$ and $R_7$, independently of one another, are $C_1$–$C_{12}$alkyl, $C_1$–$C_{12}$alkoxy, $C_1$–$C_{12}$alkylmercapto, $C_1$–$C_{12}$alkyl-$C_2$–$C_5$alkoxycarbonyl, $C_1$–$C_{12}$alkyl-$C_1$–$C_4$-N-alkylcarbamoyl or unsubstituted or halogen-, $C_1$–$C_4$alkyl-, $C_1$–$C_4$alkoxy-, $C_1$–$C_4$alkylmercapto-, CN- or $CF_3$-substituted phenyl, benzyl or benzoyl, and in the formula IV, $R_8$ and $R_9$, independently of one another, are $C_1$–$C_8$alkyl, $C_3$–$C_6$cycloalkyl, $C_7$–$C_{12}$phenylalkyl, which may be substituted in the phenyl radical by halogen, $C_1$–$C_4$alkyl, $C_1$–$C_4$alkoxy, $C_1$–$C_4$alkylmercapto, —CN, —$CF_3$, —$CH_3$, —$CONH_2$ or phenyl, or $R_8$ and $R_9$ are furthermore unsubstituted or halogen-, $C_1$–$C_4$alkyl- or $C_1$–$C_4$alkoxy-substituted naphthyl or unsubstituted or halogen-, $C_1$–$C_4$alkyl-, $C_1$–$C_4$alkoxy-, $C_1$–$C_4$alkylmercapto-, —CN, —$CF_3$, —$CCl_3$, —$CONH_2$ or phenyl-substituted phenyl, or are pyridyl.

The various alkyl groups in the above radicals may be branched or unbranched. $C_1$–$C_4$Alkyl is, for example, methyl, ethyl, n-propyl, isopropyl, n-butyl, sec-butyl or tert-butyl, but in particular methyl. $C_1$–$C_8$Alkyl may, for example, be as defined above for $C_1$–$C_4$alkyl or additionally, for example, n-propyl, isopropyl, tert-pentyl, n-hexyl or 1,1,3,3-tetramethylbutyl. $C_1$–$C_{12}$Alkyl and $C_1$–$C_{18}$alkyl are, for example, as defined above, or furthermore n-heptyl, n-octyl, nonyl, decyl, undecyl or dodecyl, or tridecyl, tetradecyl, pentadecyl, hexadecyl, heptadecyl or octadecyl.

Examples of $C_1$–$C_4$alkoxy and $C_1$–$C_{12}$alkoxy are methoxy, ethoxy, n-propoxy, isopropoxy, n-butoxy, sec-butoxy, tert-butoxy, n-pentoxy, isopentoxy, n-hexyloxy, octyloxy, decloxy and dodecyloxy, but in particular methoxy.

Examples of $C_1$–$C_4$alkylmercapto and $C_1$–$C_{12}$alkylmercapto are methylmercapto, ethylmercapto, n-propylmercapto and isopropylmercapto, and n-hexylmercapto, octylmercapto and dodecylmercapto.

In the various definitions, halogen is, for example, fluorine, chlorine or bromine, but in particular chlorine.

A halogen ion $X^{\ominus}$ is, for example, $Br^-$, $F^-$, $I^-$ or, in particular, $Cl^{31}$.

$C_3$–$C_6$Cycloalkyl and $C_5$–$C_6$cycloalkyl are, for example cyclopropyl or cyclobutyl, and cyclopentyl or cyclohexyl.

$C_7$–$C_{12}$Phenylalkyl is, for example, benzyl or phenylethyl.

$C_2$–$C_5$Alkoxycarbonyl is, for example, methoxycarbonyl, ethoxycarbonyl, n-propoxycarbonyl or butoxycarbonyl.

$R_4$ and $R_5$, $R_6$ & $R_7$, and $R_8$ and $R_9$ are preferably identical substituents.

If $R_{10}$ and $R_{11}$ together with the nitrogen atom to which they are bonded, form a 5–6-membered heterocyclic radical, it is, for example, a pyrrolidine, morpholine or piperidine radical.

If $R_{10}$, $R_{11}$ and $R_{12}$ together with the nitrogen atom to which they are bonded, form a 5–6-membered aromatic heterocyclic radical, this is, for example, a pyrrole, pyridine, picoline, pyrazine, quinoline or isoquinoline radical.

Examples which may be mentioned of $^+NH(R_{10})(R_{11})(R_{12})$ in the definition of L are: $^+NH_4$, $^+NH_3CH_3$, $^+NH_2(CH_3)_2$, $^+NH_3C_2H_5$, $^+NH_2(C_2H_5)_2$, $^+NH_3$isopropyl, $^+NH_3$cyclohexyl, $^+NH_2(CH_3)(C_6H_5)$, $^+NH_3C_6H_5$, $^+NH_3$(para-tolyl), $^+NH_3$benzyl,

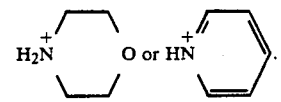

Examples of —$N^+(R_{10})(R_{11})(R_{12})X^-$ are —$NH_3^+Cl^-$, —$NH_2(CH_3)^+Cl^-$, —$NH(CH_3)_2^+Cl^-$, —$NH_2(C_2H_5)^+Cl^-$, —$NH_2(C_6H_5)^+Cl^-$ and —$NH_2(CH_2C_6H_5)^+Cl^-$.

If L is a group of the formula $M^{+n}/n$, it is an alkali metal cation, an alkaline earth metal cation or a transition metal cation, but in particular $Na^+$, $K^+$, $Mg^{2+}$, $Ca^{2+}$, $Sr^{2+}$, $Ba^{2+}$, $Mn^{2+}$, $Zn^{2+}$, $Cu^{2+}$, $Ni^{2+}$, $Cd^{2+}$, $Co^{3+}$, $Al^{3+}$ and $Cr^{3+}$; n is in particular 1 or 2, but very particularly 1; M is preferably $Na^+$; and p is perferably 1, 2 or 3.

Examples of $C_1$–$C_{12}$alkyl-$C_2$–$C_5$alkylcarbonyl and -$C_1$–$C_4$carbamoyl are —$CH_2COOCH_3$, —$CH_2COOC_2H_5$, —$CH_2COOC_4H_9$, —$CH_2CH_2COOC_2H_5$, —$CH_2CH_2CH_2COOC_2H_5$, and —$CH_2CONH_2$, —$CH_2CH_2CONH_2$ and —$CH_2CH_2CH_2CONH_2$.

Pyridyl is 2-, 3- or preferably 4-pyridyl.

Preferred compositions preferably contain a compound of the formula I, II, IIa, III or IV in which, in the formulae I, II and IIa, the two groups R, independently of one another, are —H, —Cl, —$CH_3$ or —$OCH_3$, $R_2$ is —H or $R_1$ and $R_3$ is —H or a group of the formula —$(CH_2)_p$—$R_1$, p is an integer from 1 to 6, and $R_1$ is a group of the formula —$CO_2L_1$ or —$SO_3L_1$ where $L_1$ is —H, Na or K, in the formula III, $R_4$ and $R_5$, independently of one another, are phenyl which is unsubstituted or substituted by one or two chlorine atoms, one or two $C_1$–$C_4$alkyl or $C_1$–$C_4$alkoxy groups, methylmercapto, —CN, phenyl, phenoxy or thiophenoxy, and, in the formula IV, $R_8$ and $R_9$ are 4-pyridyl, or phenyl which is unsubstituted or substituted by —Cl, —Br or by one or two $CH_3$ or $OCH_3$ groups.

Of very particular interest are compounds of the formula I or IV in which R is —H, $R_2$ is —H or $R_1$ and $R_1$ is a group of the formula $-SO_3L_1$ where $L_1$ is Na or K, and $R_8$ and $R_9$ are phenyl, 3- or 4-chlorophenyl, 3,4-dimethoxyphenyl or 3- or 4-methoxyphenyl.

The diketopyrrolopyrroles of the formulae III and IV are known products and can be prepared, for example, as described in U.S. Pat. Nos. 4,579,949, 4,659,775 and 4,778,899 (formula IV) and 4,485,878 and 4,666,485 (formula III).

With the exception of the compounds of the formula I in which $R_1$ is a group of the formula $-N^+(R_{10})(R_{11})(R_{12})X^-$, the compounds of the formula I are known products and can be prepared, for example, as described in U.S. Pat. No. 4,791,204.

By contrast, the compounds of the formula I in which $R_1$ is a group of the formula $-N^{30}(R_{10})(R_{11})(R_{12})X^-$ and the compounds of the formulae II and IIa are novel and are therefore a further subject-matter of the invention, the symbols R, $R_1$, $R_2$, $R_3$, p, L, X, M, n, $R_{10}$, $R_{11}$ and $R_{12}$ given therein being defined as above.

The compounds of the formula II can be prepared by processes which are known per se, for example by mono- or discondensation of a compound of the formula

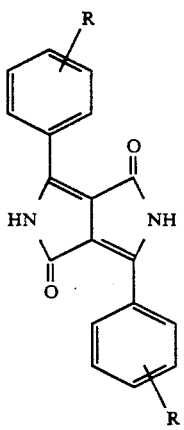

with a compound containing the radical $-(CH_2)_p-R_1$ as leaving group (for example ethyl chloroacetate) in a suitable organic solvent.

The compounds of formula IIa can be prepared, for example, by reacting 2 mol of an appropriately substituted aryl nitrile of the formula

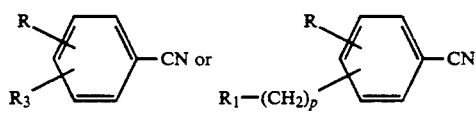

or a mixture of these compounds with 1 mol of a succinic acid diester, for example the dimethyl ester, in an analogous manner to that described in U.S. Pat. No. 4,579,949.

The compound of the formula I in which $R_1$ is a group of the formula $-N^+(R_{10})(R_{11})(R_{12})X^-$ can be prepared, for example, by quaternising a compound of the formula

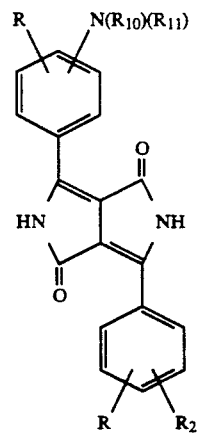

by processes which are known per se, for example using dimethyl sulfate or diethyl sulfate.

The compositions according to the invention can be obtained, for example, by mixing the individual components (a) and (b) in the desired mixing ratio. However, they can also be dissolved individually or together in a solvent which is suitable according to the invention, and the resultant solution can be employed directly for the desired application.

The mixing ratios of component (a) and the auxiliary redox system (b) may vary. However, molar amounts of these two components are expediently employed.

The auxiliary redox systems (b) used according to the invention are known compounds. They are expediently employed in pure form. Components (a) of the compositions according to the invention are expediently also employed in pure form.

An example of ammonium iron(II) sulfates is $(NH_3)_2Fe(SO_4)_2\cdot6H_2O$.

Examples of ferrocyanides which are suitable according to the invention are alkali metal salts, alkaline earth metal salts or ammonium salts thereof, for example sodium ferrocyanide, potassium ferrocyanide, calcium ferrocyanide, magnesium ferrocyanide or ammonium ferrocyanide. However, potassium ferrocyanide and sodium ferrocyanide are preferred.

The concentration of the auxiliary redox system (b) can be varied as desired; it may be, for example, between 0.001 and 0.1M, but expediently between 0.01 and 0.02M, based on the diketopyrrolopyrrole component (a). The concentration is frequently determined by the solubility of the diketopyrrolopyrroles which are suitable according to the invention, which, depending on the chemical structure, have a quite different solubility in the application medium. Equimolar amounts of components (a) and the redox system (b) are preferred.

In principle, the choice redox system (b) is not crucial. However, a redox system which is soluble in the application medium and whose redox potential is as close as possible to that of the chosen component (a) is expedient. In these cases, the process potential applied can be kept very low.

The ferrocyanide salts are expediently employed in aqueous systems or in mixtures of water with organic water-miscible or partially miscible solvents. By contrast, ferrocene is in particular used in organic systems, although small amounts of water can also be used as long as this compound remains dissolved.

Conductive salts (c) which are suitable according to the invention are all salts which are conventionally employed in voltametry and are able to generate anions and cations in the application medium, for example:

cations: $Li^+$, $Na^+$, $K^+$, $N^+(C_nH_{2n+1})_4$, where n is 1, 2, 3 or 4;

anions: $Cl^-$, $Br^-$, $I^-$, $ClO_4^-$, $BF_4^-$, $SCN^-$, $CF_3SO_3^-$, $H_2PO_2^-$, $HPO_3^{2-}$, $H_2PO_4^-$ and $HCO_3^-$.

Alkali metal halides or tetraalkylammonium halides, fluoroborates or perchlorates are expediently employed.

When selecting the conductive salt, it must be ensured that it is inert and only increases the conductivity in the application medium. The concentration of the conductive salt can be varied, but is expediently between 3 and 100 times, preferably between 10 and 80 times, in particular about 50 times, higher than that of the pyrrolopyrrole component (a).

As stated above, the compositions according to the invention are suitable as electrochromic materials in various display systems. To this end, they can be used directly in solution in aqueous or organic systems, or mixtures of water with an organic solvent.

For the aqueous systems, water of the highest possible purity, for example demineralised water, is expediently used, so that the concentration of the conductive salt or salts can be adjusted accurately or monitored during application and side reactions at the electrodes (in particular at the counterelectrode) can be avoided.

Organic systems are inert solvents, preferably water-miscible or partially miscible solvents, for example aliphatic alcohols containing 1 to 5 carbon atoms, such as methanol, ethanol, propanol, isopropanol, n-butanol, 2-butanol, tert-butanol and n-pentanol, ketones, such as acetone, methyl ethyl ketone or methyl isobutyl ketone, glycols, such as ethylene glycol, ethylene glycol monomethyl and monoethyl ether or diethylene glycol, dioxane, tetrahydrofuran, and furthermore amides, such as dimethylformamide, dimethylacetamide, pyrrolidone or N-methyl-2-pyrrolidone (NMP), acetonitrile, tetramethylurea, N,N'-dimethylpropyleneurea (DMPU), 1,2-dimethyl-2-imidazolidinone (DMEU), N,N,N',N'-tetraethylsulfamide (TES), dimethyl sulfoxide, dimethyl sulfone, tetramethyl sulfone, hexamethylphosphoric triamide, N,N,N',N'-tetramethylmethylphosphonic diamide, ethylene carbonate, ethylene sulfite, N,N,N',N'-tetramethylethylenediamine and 1,2-dimethylethane.

Mixtures of the abovementioned solvents with water are also suitable.

The concentration of component (a) of the compositions according to the invention in the abovementioned solvent is primarily determined by its solubility (it must be in solution). In general, the concentration is between 0.001 and 0.5 mol, in particular between 0.01 and 0.02 mol.

For the aqueous or partially aqueous systems, diketopyrrolopyrroles of the formula I or II which contain water-solubilising groups are expediently used. For the other systems, by contrast, diketopyrrolopyrroles of the formula III or IV are preferred.

As stated above, the compositions according to the invention can be used as electrochromic materials in various display systems, the pyrrolopyrrole components, interacting with their reduced form, electrochemically modifying their optical behaviour (reflection or transparency) in the application medium in combination with the auxiliary redox system employed and the conductive salt in such a manner that a visual and reversible change in colour can be produced.

Various systems or apparatuses can be used for this purpose, for example as in "Displays", Oct. 1983, 221–225, or Glastechnische Ber. 62(1989), 38–45. A solution of a composition according to the invention in a suitable cell is subjected for a certain time to a certain direct voltage between two electrodes (the so-called display electrode and the counterelectrode) so that the pyrrolopyrrole component (colourless or slightly yellowish in dissolved form) is reduced electrolytically on or very close to the display electrode, and the resultant product becomes coloured, the colour change produced in this way corresponding to the desired form at the display electrode employed. After reversal of the direct voltage, the colour change produced in this way disappears, and the process can be repeated as desired.

Suitable display electrodes are transparent or nonopaque electrodes, for example made from indium oxide ($In_2O_3$), indium-tin oxides, zinc oxide, titanium dioxide, antimony tin oxide (NESA), arsenic tin oxide, copper iodide, cadmium tin oxide ($Cd_2SnO_4$) and in particular indium and tin mixed oxides (so-called ITO electrodes). Electrodes of this type are expediently in the form of a coating on a glass substrate. Further suitable electrodes are very thin metal films.

Suitable counterelectrodes, where a corresponding electrochemical reaction takes place, are also expediently transparent electrodes of the abovementioned composition. However, it is also prossible to use other electrodes, for example coloured electrodes. In this case, a membrane which is permeable to the ions suitable according to the invention must be installed in the solution according to the application between the two electrodes in order to screen the inherent colour of this electrode, so that light reflection from the coloured counterelectrodes onto the display electrode can be excluded.

Expediently, low direct voltages are applied between the two electrodes, for example direct voltages of between 0.1 and 10 V, preferably between 0.2 and 5 V, very particularly between 0.5 and 2.0 V.

The shape of the displays, in particular for numbers, can be controlled or formed, for example, by using a 7-segment device by suitable controlled switching of the electrodes in accordance with the shape of the desired numbers.

A system which is preferred according to the invention contains a diketopyrrolopyrrole of the formula IV where $R_8$ and $R_9$ are phenyl, in combination with ferrocene as the auxiliary redox system in a dimethyl sulfoxide solution and with an ITO display electrode.

For aqueous systems, it may be particularly advantageous to use water-soluble porous polymers, for example agar, gelatin, methylcellulose, polyvinyl alcohol or polyvinylpyrrolidones, in a concentration of, for example, from 0.1 to 10% by weight, based on the amount of solvent or water. The polymer is expediently added in order to fix the electrochemically modified coloured component (a) on or in the region of the display electrode. This makes it possible to prevent the coloured component (a) moving too far from the electrode and resulting in excessively diffuse or unsharp images.

The compositions according to the invention can be used to obtain various coloured displays, for example from orange via red to violet display colours on a colourless background.

The compositions according to the invention can be used in various display systems, for example for the formation of letters, numbers and images in watches, display panels and display instruments, furthermore in X/Y matrix displays for screens, for example for TV sets, based on electrochromic displays. Furthermore, the systems according to the invention can also be used for smart windows (function-modifiable windows). The displays obtained are multicoloured, easily read, irrespective of the viewing angle, and have good contrast. The memory effect associated therewith can also be utilised according to the application. In addition, various types of display can be produced using small direct voltages.

The examples below illustrate the invention.

EXAMPLE 1

A 1 mM DMSO solution of a compound of the formula IV in which $R_8$ and $R_9$ are phenyl, 1 mM of ferrocene and 50 mM of tetrabuylammonium perchlorate is introduced into a cell containing two ITO electrodes, as described in Japanese Journal of Applied Physics 26, p. 1357, FIG. 2. A chequered, red image pattern 1.0 cm² in size is produced at the display electrode by applying a direct voltage of 2 V for one second. A contrast ratio of 10 at 585 nm is achieved, this number indicating the ratio between the transmission of the base solution (at λ 585) and the transmission of the coloured display electrode at the same wavelength. Using this system, up to $10^5$ write/erase cycles can be obtained. (DMSO=-dimethyl sulfoxide).

EXAMPLE 2

Example 1 is repeated, but the ferrocene is replaced by the same amount of sodium ferrocyanide (1 mM) and in addition 10% by weight of demineralised water are used in the DMSO solution, and a direct voltage of 1.0 V is applied instead of 2 V. The same contrast ratio as above is obtained, and up to $10^4$ cycles are achieved.

EXAMPLE 3

A 0.25 mM NMP solution of a compound of the formula IV in which $R_8$ and $R_9$ are meta-chlorophenyl, 2 mM of ferrocene and 100 mM of sodium perchlorate is introduced into the same cell as in Example 1. A red display is produced by applying a direct voltage of 2.0 V for one second, and $10^4$ write/erase cycles (one second between each writing and erasing operation) are obtained. Contrast ratio at 580 nm:4; (NMP=N-methyl-2-pyrrolidone).

EXAMPLE 4

Example 1 is repeated, but with the difference that the compound of the formula IV indicated therein is replaced by 10 mM of a pyrrolopyrrole compound of the same formula, in which $R_8$ and $R_9$ are para-tert-butyl, 5 mM of ferrocene (instead of 1 mM) and 150 mM of tetrabutylammonium perchlorate are used (instead of 50 mM). This electrochromic system gives a contrast ratio of 20 and a life of $10^5$ cycles.

EXAMPLE 5

30 mM of a compound of the formula IV in which $R_8$ and $R_9$ are 3,4-dimethoxyphenyl, 15 mM of potassium ferrocyanide and 200 mM of sodium perchlorate are dissolved in a mixture of 90% by weight of dioxane and 10% by weight of water, and the solution is treated further as in Example 1, with a direct voltage of 1.1 V being applied alternately for one second (the time without voltage is also one second). This system gives a contrast ratio of 33 and a life of $10^5$ cycles.

EXAMPLE 6

The procedure is as in Example 5 above, but the pyrrolopyrrole indicated therein is replaced by 30 mM of a compound of the formula IV in which $R_8$ and $R_9$ are para-isopropylphenyl. Equally good displays are obtained.

EXAMPLE 7

A 0.02M aqueous solution of a compound of the formula I in which R is —H and $R_1$ and $R_2$ are para-$SO_3Na$, 0.02M of sodium ferrocyanide and 0.5M of potassium chloride is treated with a direct voltage of 1.5 V as described in Example 1 (writing duration: 1 second, erasing time: 1 second). A contrast of 28 at 560 nm and a life of more than $10^4$ cycles are obtained.

EXAMPLE 8

The procedure is as in Example 7 above, but the pyrrolopyrrole indicated therein is replaced by a compound of the formula I in which R is —H and $R_1$ and $R_2$ are para-COONa. A contrast ratio of 8 at 560 nm and a life of $10^3$ cycles are obtained.

EXAMPLE 9

The procedure is as in Example 7 above, but an additional 5 % by weight of gelatin and a voltage of 1.6 V (instead of 1.5 V) are used. A contrast ratio of 20 and a life of more than $10^3$ cycles are obtained.

EXAMPLE 10

An aqueous solution containing 0.01M of the pyrrolopyrrole compound described in Example 7,6% by weight of polyvinyl alcohol, 0.01M of potassium ferrocyanide and 0.2M of tetrabutylammonium perchlorate is treated at 1.8 V in the same way as in Example 1 (writing time 1 second, erasing time 1 second). A contrast ratio of 15 and a life of more than $10^3$ cycles are obtained.

What is claimed is:

1. A composition containing
   (a) at least one 1,4-diketopyrrolo[3,4-c]pyrrole of the formula I, II, IIa, III or IV

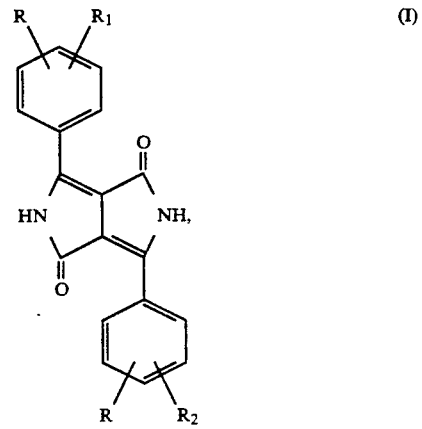

-continued

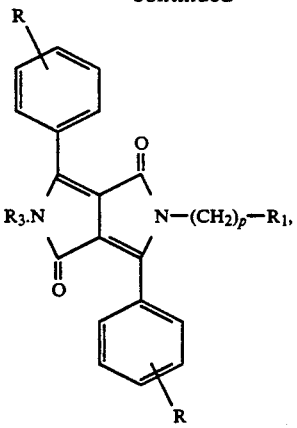

(II)

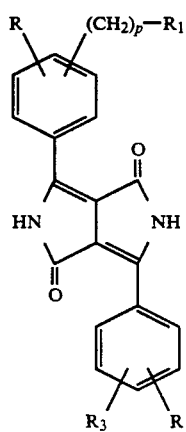

(IIa)

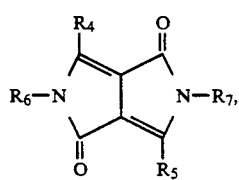

(III)

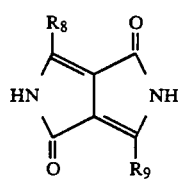

(IV)

and (b) an auxiliary redox system which comprises sodium ferrocyanide, potassium ferrocyanide, calcium ferrocyanide, magnesium ferrocyanide, ammonium ferrocyanide or $(NH_3)_2Fe(SO_4)_2\cdot 6H_2O$ in combination with at least one conductive salt (c) from salts wherein the cation is selected from $Li^+$, $Na^+$, $K^+$ and $N^+(C_nH_{2n+1})_4$, where n is 1, 2, 3 or 4 and the anion is selected from $Cl^-$, $Br^-$, $I^-$, $ClO_4^-$, $BF_4^-$, $SCN^-$, $CF_3SO_3^-$, $H_2PO_2^-$, $HPO_3^{2-}$, $H_2PO_4^-$ and $HCO_3^-$; where, in the formulae I, II and IIa, the groups R, independently of one another are —H, halogen, $C_1$-$C_4$alkyl, $C_1$-$C_4$alkoxy, $C_1$-$C_4$mercaptoalkyl, —CH, —CF$_3$ or phenyl, $R_2$ is —H or $R_1$, and $R_3$ is —H or a group of the formula —(CH$_2$)$_p$—$R_1$, p is an integer from 1 to 6, and $R_1$ is a group of the formula —CO$_2$L, —SO$_3$L, —PO$_3$L or —N$^+$(R$_{10}$)(R$_{11}$)(R$_{12}$)X$^-$ in which X is a halogen ion, $(SO_4)^{2-}$, $(SO_3OCH_3)^-$ or $(SO_2OC_2H_5)^-$ and L is —H, a group of the formula M$^{+n}$/n or $^+NH(R_{10})(R_{11})(R_{12})$ where M is a monovalent, divalent or trivalent metal cation, n is the number 1, 2 or 3, and $R_{10}$, $R_{11}$ $R_{12}$, independently of one another, are —H, $C_1$-$C_{18}$alkyl, $C_7$-$C_{12}$phenylalkyl, $C_5$-$C_6$cycloalkyl, or phenyl or naphthyl which is unsubstituted or substituted by halogen, $C_1$-$C_4$alkyl or $C_1$-$C_4$alkoxy, or $R_{10}$ and $R_{11}$, together with the nitrogen atom to which they are bonded, form a 5-6-membered heterocyclic radical which is pyrrolidino, morpholino or piperidino; or $R_{10}$, $R_{11}$ and $R_{12}$, together with the nitrogen atom to which they are bonded, form a 5-6-membered aromatic heterocyclic radical which is a quaternized pyrrolyl, pyridyl, picolyl, pyrazinyl, quinolyl or isoquinolyl group; in the formula III, $R_4$ and $R_5$, independently of one another, are unsubstituted or halogen-, $C_1$-$C_4$alkyl- or $C_1$-$C_4$alkoxy-substituted naphthyl, phenyl or pyridyl, which in turn can be substituted by one or two halogen atoms, one or two $C_1$-$C_4$alkyl or $C_1$-$C_4$alkoxy groups, furthermore by $C_1$-$C_4$alkylmercapto, —CN, CF$_3$, —CCl$_3$, —CONH$_2$, $C_2$-$C_5$alkoxycarbonyl or unsubstituted or halogen-, CH$_3$- or OCH$_3$-substituted phenyl, phenoxy, thiophenoxy or N-phenylcarbamoyl, and $R_6$ and $R_7$, independently of one another, are $C_1$-$C_{12}$alkyl, $C_1$-$C_{12}$alkoxy, $C_1$-$C_{12}$alkylmercapto, $C_1$-$C_{12}$alkyl-$C_2$-$C_5$alkoxycarbonyl, $C_1$-$C_{12}$alkyl-$C_1$-$C_4$-N-alkylcarbamoyl or unsubstituted or halogen-, $C_1$-$C_4$alkyl-, $C_1$-$C_4$alkoxy-, $C_1$-$C_4$alkylmercapto-, CN- or CF$_3$-substituted phenyl, benzyl or benzoyl, and in the formula IV, $R_8$ and $R_9$, independently of one another, are $C_1$-$C_8$alkyl, $C_3$-$C_6$cycloalkyl, $C_7$-$C_{12}$phenylalkyl, which may be substituted in the phenyl radical by halogen, $C_1$-$C_4$alkyl, $C_1$-$C_4$alkoxy, $C_1$-$C_4$alkylmercapto, —CN, —CF$_3$, —CH$_3$, —CONH$_2$ or phenyl, or $R_8$ and $R_9$ are furthermore unsubstituted or halogen-, $C_1$-$C_4$alkyl- or $C_1$-$C_4$alkoxy-substituted naphthyl or unsubstituted or halogen-, $C_1$-$C_4$alkyl-, $C_1$-$C_4$alkoxy-, $C_1$-$C_4$alkylmarcapto-, —CN, —CF$_3$, —CCl$_3$, —CONH$_2$ or phenyl-substituted phenyl, or are pyridyl.

2. A composition according to claim 1, containing a diketopyrrolopyrrole of the formula I, II, IIa, III or IV in which, in the formulae I, II and IIa, the two groups R, independently of one another, are —H, —CL, —CH$_3$ or —OCH$_3$, $R_2$ is —H or $R_1$ and $R_3$ is —H or a group of the formula —(CH$_2$)$_p$-$R_1$, p is an integer from 1 to 6, and $R_1$ is a group of the formula —CO$_2$L$_1$ or —SO$_3$L$_1$ where L$_1$ is —H, Na or K, in the formula III, $R_4$ and $R_5$, independently of one another, are phenyl which is unsubstituted or substituted by one or two chlorine atoms, one or two $C_1$-$C_4$alkyl or $C_1$-$C_4$alkoxy groups, methylmercapto, —CN, phenyl, phenoxy or thiophenoxy, and, in the formula IV, $R_8$ and $R_9$ are 4-pyridyl, or phenyl which is unsubstituted or substituted by —Cl, —Br or by one or two CH$_3$ or OCH$_3$ groups.

3. A composition according to claim 1, containing a diketopyrrolopyrrole of the formula I or IV in which R is —H, $R_2$ is —H or $R_1$, and $R_1$ is a group of the formula —SO$_3$L$_1$ where L$_1$ is Na or K and $R_8$ and $R_9$ are phenyl, 3- or 4-chlorophenyl, 3,4-dimethoxyphenyl or 3- or 4-methoxyphenyl.

4. A composition according to claim 1, containing, as auxiliary redox system (b), potassium ferrocyanide or sodium ferrocyanide.

5. A composition according to claim 1, containing equimolar amounts of component (a) and the redox system (b).

6. A composition according to claim 1, containing, as conductive salt (c), and alkali metal halide, fluoroborate or perchlorate or a tetraalkylammonium halide, fluoroborate or perchlorate.

* * * * *